United States Patent
Siegmund

(10) Patent No.: US 6,539,681 B1
(45) Date of Patent: Apr. 1, 2003

(54) SPACER PLATE FOR A HOLLOW FLOOR AND A HOLLOW FLOOR MADE THEREWITH

(76) Inventor: Helmut Siegmund, Im Auel 6, 53604 Bad Honnef (DE)

( * ) Notice: Subject to any disclaimer, the term of this patent is extended or adjusted under 35 U.S.C. 154(b) by 0 days.

(21) Appl. No.: 09/663,441

(22) Filed: Sep. 15, 2000

(30) Foreign Application Priority Data

Sep. 21, 1999 (DE) .................................. 299 16 642 U

(51) Int. Cl.⁷ .............................................. E04F 15/22
(52) U.S. Cl. ...................... 52/403.1; 52/480; 52/180; 428/156; 428/174; 428/179; 428/180; 404/36; 404/38; 405/38; 405/45
(58) Field of Search ................. 52/177, 180, 403.1, 52/480, 311.1, 314, 390; 428/120, 44, 119, 218, 174, 156, 163, 166, 167, 178–181; 405/38, 45; 404/35, 36, 38

(56) References Cited

U.S. PATENT DOCUMENTS

| | | | | |
|---|---|---|---|---|
| 3,438,312 A | * | 4/1969 | Becker et al. ................. | 52/177 |
| 3,909,996 A | * | 10/1975 | Ettlinger, Jr. et al. ......... | 52/177 |
| 4,436,779 A | * | 3/1984 | Menconi et al. ............ | 428/169 |
| 4,468,910 A | * | 9/1984 | Morrison ..................... | 52/591 |
| D301,529 S | * | 6/1989 | Jonker ......................... | D6/583 |
| 4,923,733 A | * | 5/1990 | Herbst ........................ | 428/156 |
| 4,930,286 A | * | 6/1990 | Kotler ......................... | 52/177 |
| 5,052,161 A | * | 10/1991 | Whitcare ..................... | 52/385 |
| 5,234,738 A | * | 8/1993 | Wolf ........................... | 428/120 |
| 5,456,966 A | * | 10/1995 | Austin ........................ | 428/120 |
| 5,489,462 A | * | 2/1996 | Sieber ........................ | 428/174 |
| 5,619,832 A | * | 4/1997 | Myrvold .................... | 52/403.1 |
| 5,950,378 A | * | 9/1999 | Council et al. .............. | 52/177 |
| 5,992,106 A | * | 11/1999 | Carling et al. ............... | 52/177 |
| 6,050,040 A | * | 4/2000 | Jones .......................... | 52/390 |
| 6,098,354 A | * | 8/2000 | Skandis ....................... | 52/177 |
| 6,199,335 B1 | * | 3/2001 | Brenot et al. ................. | 52/480 |

FOREIGN PATENT DOCUMENTS

EP  0 371 268  2/1993

* cited by examiner

Primary Examiner—Yvonne M. Horton
(74) Attorney, Agent, or Firm—McCormick, Paulding & Huber LLP

(57) ABSTRACT

A spacer plate for use in making a hollow floor has a plurality of truncated cone-shaped spacer elements extending from one side of the plate, and distributed in a row wise and column wise arrangement, for supporting the spacer plate from an underfloor, and also formed in the spacer plate are grooves formed in the same side of the plate as the spacer elements for holding a pipe conducting a heating or cooling medium, with the grooves surrounding at least a half of the circumference of the pipe to securely hold the pipe in place on the plate, so that the heating or cooling medium conducted through the pipe can come into heat exchange relationship not only with an upper floor laid on top of the spacer plate but also with air conducted through space existing between the spacer plate and the underfloor.

3 Claims, 2 Drawing Sheets

SPACER PLATE FOR A HOLLOW FLOOR AND A HOLLOW FLOOR MADE THEREWITH

FIELD OF THE INVENTION

The invention concerns a spacer plate for a hollow floor, which spacer plate has distributed over its surface an array of spacer elements intended to supportingly engage an underfloor, as well as an array of holding elements for holding a pipe for a heating or cooling medium, with the spacer elements being formed as truncated cone-shaped protuberances extending away from one side of the plate.

BACKGROUND OF THE INVENTION

One such spacer plate is for example known from EP 371268. In this known solution the spacer plate is made of a plastic foil in which the spacer elements are formed as deep drawn protuberances, while the holding elements are formed by clamping cogs, which likewise are formed by deep drawing from the side of the foil opposite to the protuberances. This has the result that the pipe held between the clamping cogs becomes almost entirely cast into the plaster of the upper floor, so that the heating medium transported by the pipe transmits its heat in large part to the plaster. The air which may possibly be moved through the underfloor can take on only little heat from the pipe or can take on such heat only with a relatively large time delay.

The invention has as its object the provision of a spacer plate of the aforementioned kind which when used in a hollow floor offers the possibility that the heating medium or cooling medium pipe or pipes held by the spacer plate can come into heat exchange with the upper floor as well as also with air moving through the hollow space between the upper floor and the lower floor.

SUMMARY OF THE INVENTION

This object is solved in accordance with the invention in that the holding elements are formed by grooves, which grooves are formed in the spacer plate so as to extend away from the same side of the spacer plate as the protrusions, which grooves surround at least half of the circumference of a pipe which is laid into the grooves.

In the case of the spacer plate of the invention, a heat or cooling medium conducting pipe extends with at least a half of its cross section into the hollow space formed by the spacer elements between the upper floor and the lower floor. Therefore, the pipe can have a heat exchanging effect both with the upper wall and also with air moving through the lower wall. This offers the possibility of relatively quickly changing the temperature of the room air by way of the air moving through the hollow floor, that is to warm or to cool, while a change in the room temperature by way of the change in the temperature of the upper floor is only achieved with a relatively large slowness.

The spacer plate can as in the known solution be made of a plastic foil or however can also be made of a metal sheet, whereby in both cases the protrusions and the grooves can be manufactured by deep drawing of the starting material. There exists a however also the possibility that the spacer plate can be manufactured of mineral material, for example, by molding.

Preferably the protrusions are arranged equidistantly in rows and columns, with the grooves extending column wise and row wise transversely over the protrusions, so that a rectangular groove network is provided for the setting of the pipe. To have a greater freedom in the setting of the pipe, it is advantageous if further grooves are provided which extend diagonally to the column and row wise oriented grooves.

To make possible a meanderingly shaped setting of the pipe, in accordance with the invention, between each four protrusions a circular shaped groove is formed which between each two protrusions coincides with the column wise and row wise grooves. Thereby reverse turn loops of a pipe can be laid on the spacer plate.

The invention concerns further a hollow floor with a spacer plate lying on an underfloor, on which spacer plate the pipes for a cooling or heating medium are arranged and which spacer plate carries an upper floor, with the spacer plate being formed in the previously described way.

BRIEF DESCRIPTION OF THE DRAWINGS

The following description explains the invention in cooperation with the accompanying drawings by way of an exemplary embodiment. The drawings are.

DESCRIPTION OF THE PREFERRED EMBODIMENT

Figure 1:
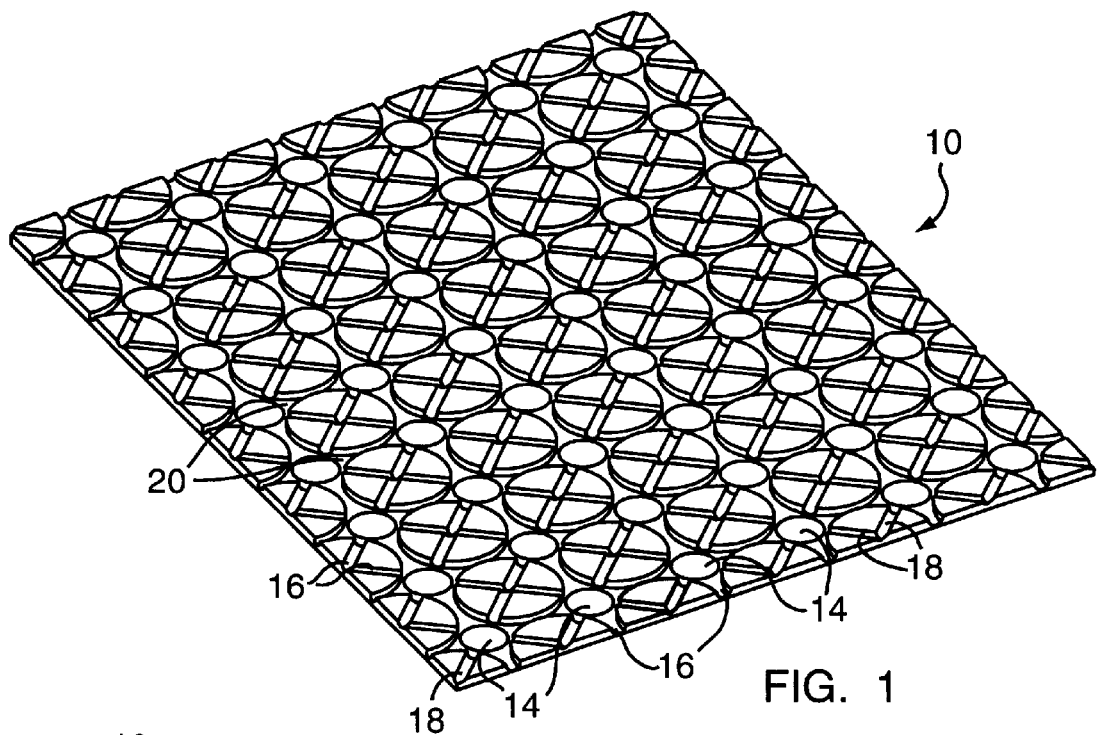
FIG. 1—a perspective view of a spacer plate according to the invention taken from above the spacer plate, FIG. 2—a plan view of the spacer plate of the invention from below the spacer plate, FIG. 3—a side view of the spacer plate of the invention, and FIG. 4—a schematic section through a hollow floor using a spacer plate of the invention.
Figure 2:
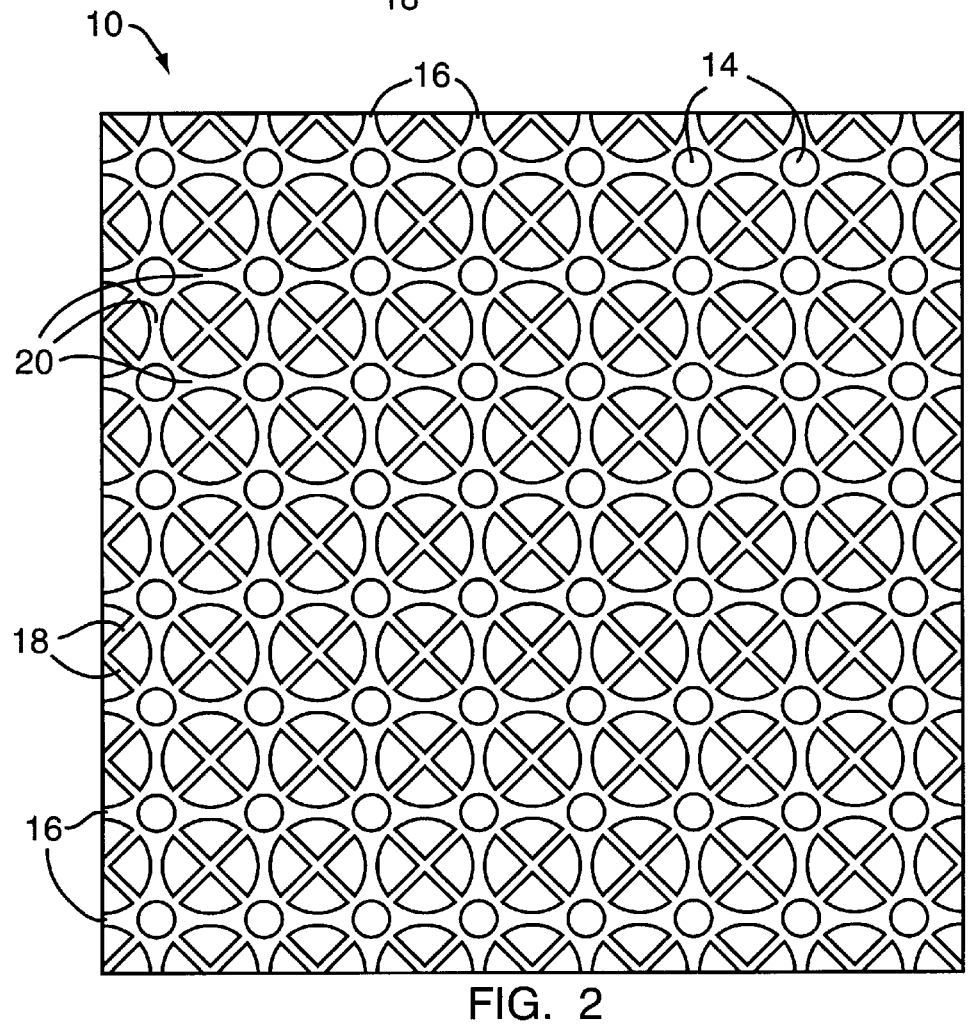

The spacer plate, designated generally at 10, illustrated in FIG. 1 consists of a plastic foil, in which deep drawn depressions (as considered from the upper side) or protrusions 14 (as considered from the under side) are formed in column wise and row wise arrangement. The protrusions 14 have the form of truncated cones and form the spacer elements of the spacer plate 10. Further, formed by deep drawing in the plastic foil from the same side of the spacer plate as the protrusions 14 are first grooves 16, which extend transversely over the protrusions 14 column wise and row wise parallel to the edges of the rectangular or square spacer plate. As seen in FIGS. 1 and 2, the spacer plate also has second grooves 18, which run diagonally to the first grooves 16. Finally, between each of four protrusions 14 a circular third groove 20 is formed which connects each two parallel neighboring first grooves with one another, that is between two neighboring protrusions 14 it partially coincides with the straight line groove section running between those protrusions, as can be seen in FIG. 2.

The grooves 16, 18 and 20 serve for the holding of pipes 22 (FIG. 4) which conduct heat or cooling medium and surround these pipes by somewhat more than half of their circumference. Therefore, the pipes 22 are clamped in the grooves and are securely held in place.

The spacer plate 10 can, instead of being made from a plastic foil, also be made from a metal sheet by deep drawing or can be made from a molded mineral material.

Figure 3:
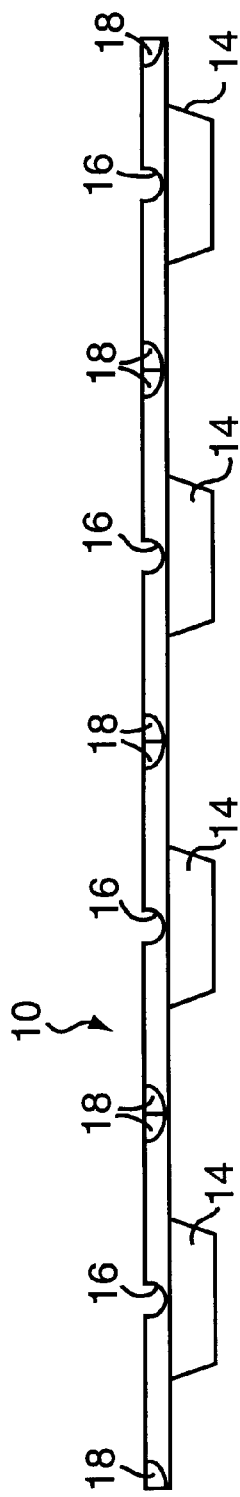
Figure 4:
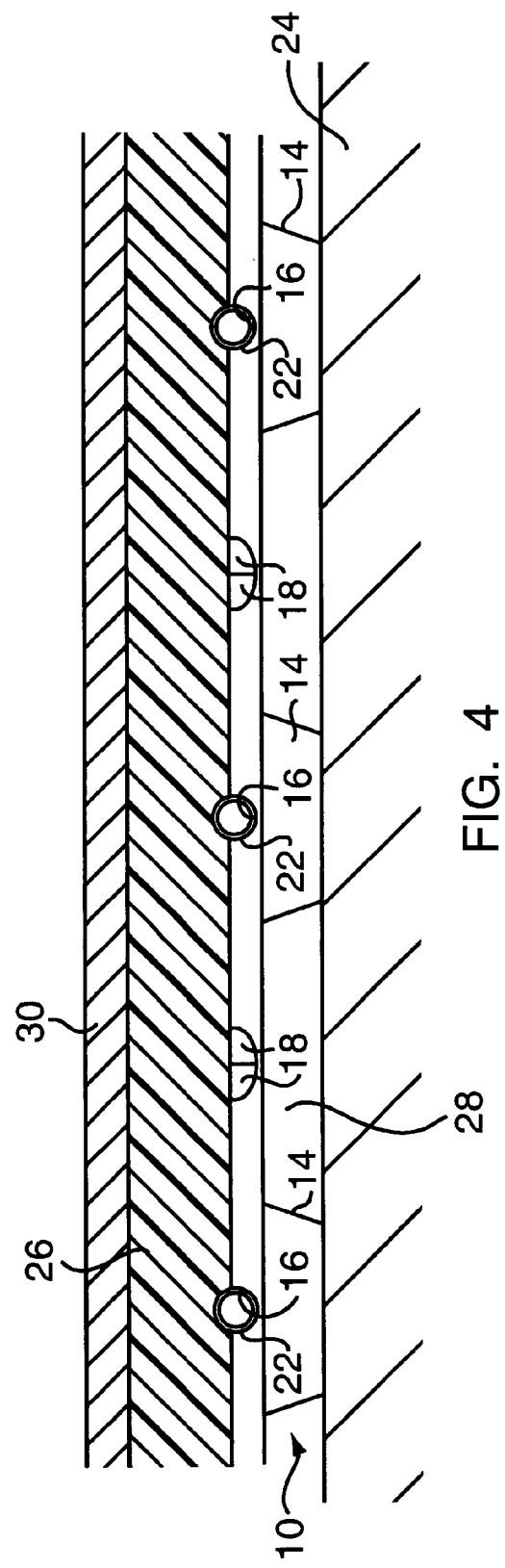

FIG. 4 shows a hollow floor using a spacer plate such as illustrated in FIGS. 1–3. The spacer plate 10 is placed onto an underfloor 24 so that the protrusion shaped spacer elements stand on the underfloor 24. Subsequently, the heating medium pipes 22 are placed in the desired way into the grooves 16, 18 and 20, with the multiplicity of the grooves making available a great freedom as to the particular placement of the pipes. Then a plaster layer 26 can be applied onto the spacer plate 10 with the plaster also filling the spacer elements 14 and thereby providing a stability in that the spacer plate 10 can not be compressed in the hollow space 28 formed between the spacer 10 and the underfloor 24. The actually floor surfacing 30 is then applied onto the plaster 26.

As can be seen in FIG. 4, the pipes 22 lie with at least half of their circumference in the air space 28. Therefore they can come into heat exchange relationship with air which is conducted through the hollow space 28. The air for example blown into the room from the edges of the floor, makes possible a rapid change of room temperature. At the same time the pipes 24 also stand in heat exchange relationship with the plaster 26 and thereby with the upper floor and can heat or cool these in the traditional way.

What is claimed is:

1. A spacer plate for a hollow floor, said spacer plate having a surface and a plurality of spacer elements distributed over the surface for engagement with an underfloor (24) and a holding element (16, 18, 20) for holding a pipe (22) for a heating or cooling medium, wherein: the spacer elements are formed by truncated cone-shaped protrusions (14) extending away from one side of the spacer plate, and the holding elements are formed by grooves (16, 18, 20) which are formed in the spacer plate (20) on the same side of the plate as the protrusions (14), which grooves surround the pipe to be placed in the grooves by at least a half of the circumference of the pipes, wherein the protrusions (14) are arranged equidistantly in rows and columns and wherein the grooves (16) extend column wise and row wise transversely over the protrusions.

2. A spacer plate according to claim 1 wherein further grooves (18) are provided, which further grooves extend diagonally to the column wise and row wise oriented grooves (16).

3. A spacer plate according to claim 1 wherein between each four protrusions (14) a circular shaped groove (20) is formed which circular shaped groove coincides at least partially between each two protrusions (14) with the column and row wise oriented grooves (16).

* * * * *